(12) United States Patent
Borch et al.

(10) Patent No.: US 11,190,973 B2
(45) Date of Patent: Nov. 30, 2021

(54) TECHNOLOGIES FOR LINK-BANDWIDTH-AWARE ROUTING

(71) Applicant: Intel Corporation, Santa Clara, CA (US)

(72) Inventors: Eric R. Borch, Fort Collins, CO (US); Keith D. Underwood, Powell, TN (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 15/450,651

(22) Filed: Mar. 6, 2017

(65) Prior Publication Data

US 2018/0255477 A1    Sep. 6, 2018

(51) Int. Cl.
 *H04W 28/02* (2009.01)
 *H04W 72/04* (2009.01)
 *H04L 12/931* (2013.01)

(52) U.S. Cl.
 CPC ... *H04W 28/0289* (2013.01); *H04W 72/0453* (2013.01); *H04L 49/00* (2013.01); *Y02D 30/70* (2020.08)

(58) Field of Classification Search
 CPC ......... H04L 47/10; H04L 47/30; H04L 47/11; H04L 47/12; H04L 47/35; H04L 47/32; H04L 47/127; H04L 2012/5608; H04W 84/12; H04W 88/08
 USPC .... 370/229, 235, 237, 310.2, 216, 322, 328, 370/338, 332, 349
 See application file for complete search history.

(56) References Cited

U.S. PATENT DOCUMENTS

| | | | | |
|---|---|---|---|---|
| 2004/0042402 A1* | 3/2004 | Galand | ............ | H04L 1/22 370/237 |
| 2007/0160061 A1* | 7/2007 | Vasseur | ............ | H04L 45/02 370/395.4 |
| 2011/0038253 A1* | 2/2011 | Yabusaki | ............ | H04L 45/02 370/217 |
| 2012/0170582 A1 | 7/2012 | Abts et al. | | |
| 2015/0074285 A1* | 3/2015 | Gahm | ............ | H04L 47/11 709/231 |
| 2017/0048144 A1* | 2/2017 | Liu | ............ | H04L 47/122 |

OTHER PUBLICATIONS

M. Palesi, G. Longo, S. Signorino, R. Holsmark, S. Kumar and V. Catania, "Design of Bandwidth Aware and Congestion Avoiding Efficient Routing Algorithms for Networks-on-Chip Platforms," Second ACM/IEEE International Symposium on Networks-on-Chip (nocs 2008), Newcastle upon Tyne, 2008, pp. 97-106.

(Continued)

Primary Examiner — Brenda H Pham
(74) Attorney, Agent, or Firm — Compass IP Law PC

(57) ABSTRACT

Technologies for link-bandwidth-aware routing are disclosed. In order to avoid congestion while still allowing link bandwidth to be decreased in order to save power, a network switch may select a port to send a packet over based on the present link bandwidth of the data links connected to the various output ports of the network switch. The network switch preferentially sends the packet over the minimal output port, or, if the minimal output port is congested, over one of the ports with the highest available link bandwidth. If the link bandwidth of the data link connected to the selected output port is not high enough, the network switch will automatically dynamically increase the link bandwidth of the data link as necessary.

19 Claims, 5 Drawing Sheets

(56) References Cited

OTHER PUBLICATIONS

Xiao-Hui Lin, Yu-Kwong Kwok and V. K. N. Lau, "BGCA: bandwidth guarded channel adaptive routing for ad hoc networks," 2002 IEEE Wireless Communications and Networking Conference Record. WCNC 2002 (Cat. No.02TH8609), 2002, pp. 433-439 vol. 1.

German Examination Report for Patent Application No. 102018001034.2, dated Sep. 15, 2021, 8 pages.

* cited by examiner

TECHNOLOGIES FOR LINK-BANDWIDTH-AWARE ROUTING

GOVERNMENT RIGHTS CLAUSE

This invention was made with Government support under contract number H98230-13-D-0124 awarded by the Department of Defense. The Government has certain rights in this invention.

BACKGROUND

Current network fabrics require adaptive routing in order to perform well. Adaptive routing allows for a network switch to route a packet on a path which avoids network congestion. Adaptive routing may increase the available bandwidth between two points on the network as well as improve overall network performance.

In certain environments, such as in high performance computing (HPC) systems or data centers, high bandwidth links may be used to connect compute devices and network switches. The high bandwidth links and the resources necessary to maintain them may require a significant amount of power. To address this, the bandwidth of each link may be modulated when high bandwidth is not required, reducing the overall power usage.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
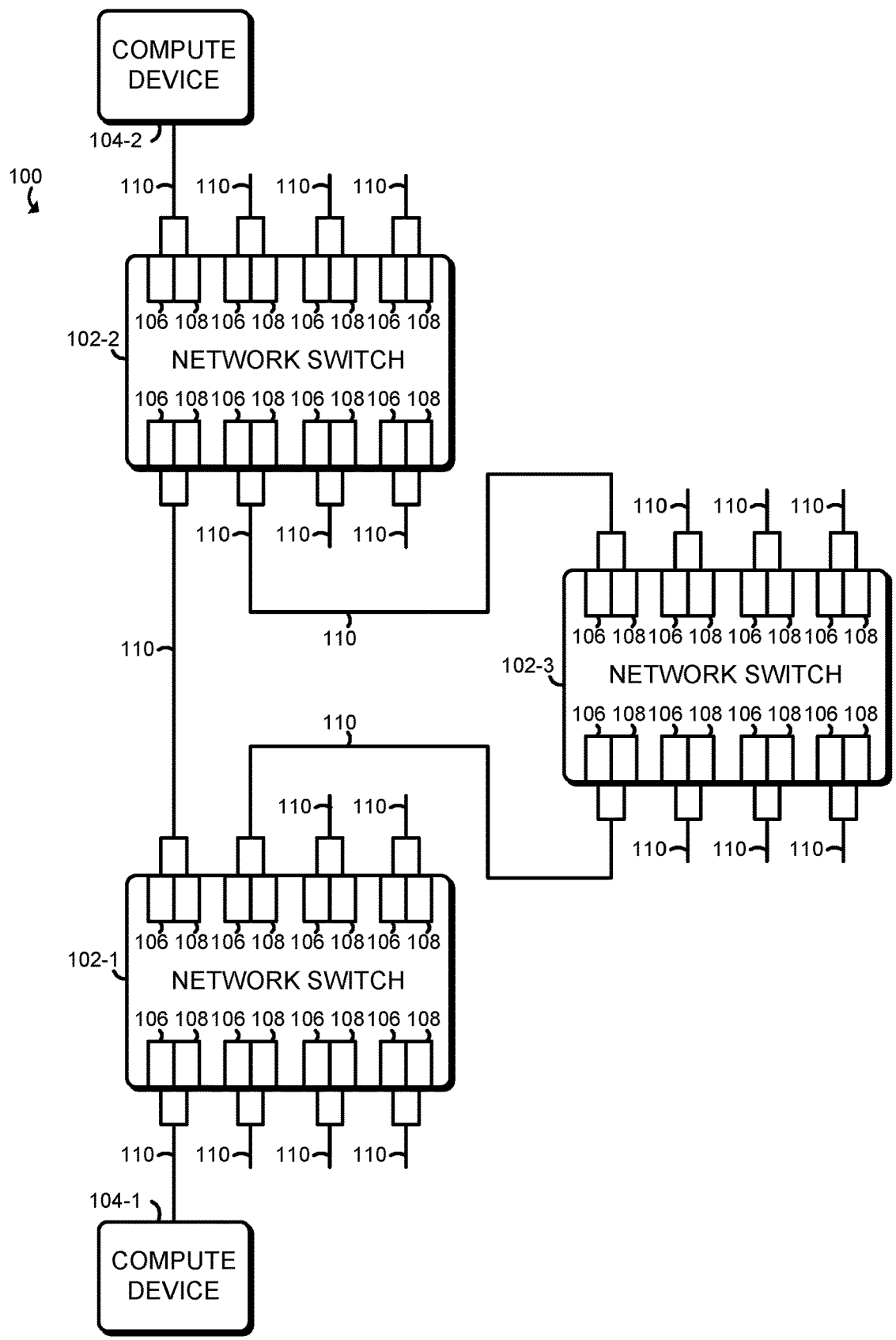
FIG. 1 is a simplified block diagram of at least one embodiment of a network for link-bandwidth-aware routing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 includes several network switches 102 connected to each other and to several compute devices 104. Each of the illustrative network switches 102 is configured to implement a link-bandwidth-aware routing algorithm, which may avoid or reduce congestion and select data links 110 with a high bandwidth availability. Each output port 108 of each network switch 102 adjusts the available bandwidth based on a recent usage of the output port 108 in order to reduce power usage. The bandwidth availability and congestion level of each output port 108 is communicated to each input port 106. When choosing which output port 108 to which a packet should be routed from an input port 106, the network switch 102 may first determine a minimal output port 108 associated with a short path to the destination of the packet as well as several alternate output ports 108. The network switch 102 may select the alternate output ports 108 based on the link availability of those output ports 108, and then select the output port 108 with a low congestion from among the minimal output port 108 and the alternate output ports 108.

For example, in the illustrative embodiment shown in FIG. 1, a first compute device 104-1 may communicate with a second compute device 104-2 over one or more data links 110 and network switches 102. When a first network switch 102-1 receives a packet from the first compute device 104-1 with the destination of the second compute device 104-2, it may determine the minimal output port 108 is the one that connects directly to the second network switch 102-2. If the minimal output port 108 is not congested, the first network switch 102-1 may send the packet to the second network switch 102-2 over the minimal output port 108. Otherwise, the first network switch 102-1 may look for alternate output ports 108, such as the output port 108 which is connected to a third network switch 102-3. If the alternate output port 108 is less congested than the minimal output port 108, the network switch 102 may send the packet using the alternate output port 108 to the third network switch 102-3.

The compute devices 104 of the system 100 may be embodied as any type of compute device capable of communicating with the network switch 102. For example, the compute device 104 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

Each data link 110 may be embodied as any type of data link over which the network switches 102 and/or compute devices 104 can communicate. For example, each data link 110 may be embodied as one or more twisted pairs of wire, one or more coaxial cables, one or more fiber optic cables, or any other wired connection. Additionally or alternatively, in some embodiments, some or all of the data links 110 may be embodied as wireless connections. In the illustrative embodiment, each data link 110 is embodied as a single cable for both sending data and receiving data that is connected to both an input port 106 and an output port 108 of a given network switch 102. Each data link 110 is depicted in FIG. 1 as being split near the end of the data link 110 and connected to a separate input port 106 and output port 108, but it should be appreciated that the data link 110 may be connected to both an input port 106 and an output port 108 in one connector. For example, each data link 110 may be embodied as a Category 5, 5e or 6 cable with RJ45 connector. Additionally or alternatively, in some embodiments, a data link 110 may provide only for one-way data transfer. For example, a data link 110 may be established or connected from an output port 108 on the first network switch 102-1 to an input port 106 on the second network switch 102-2 without being connected from an output port 108 on the second network switch 102-2 back to an input port 106 on the first network switch 102-1. In the illustrative embodiment, the bandwidth of each data link 110 can be modulated by the output port 108 or input port 106 to which it is connected. For example, a data link 110 may include several lanes, which may be embodied as signals on different cables or as signals of different frequencies on the same cable, and the various lanes may be activated or deactivated independently, changing the bandwidth of the data link 110. Of course, the bandwidth of a data link 110 may be modulated in a different manner, such as by changing a frequency of the data link 110, changing a duty cycle of the data link 110, etc.

Figure 2:
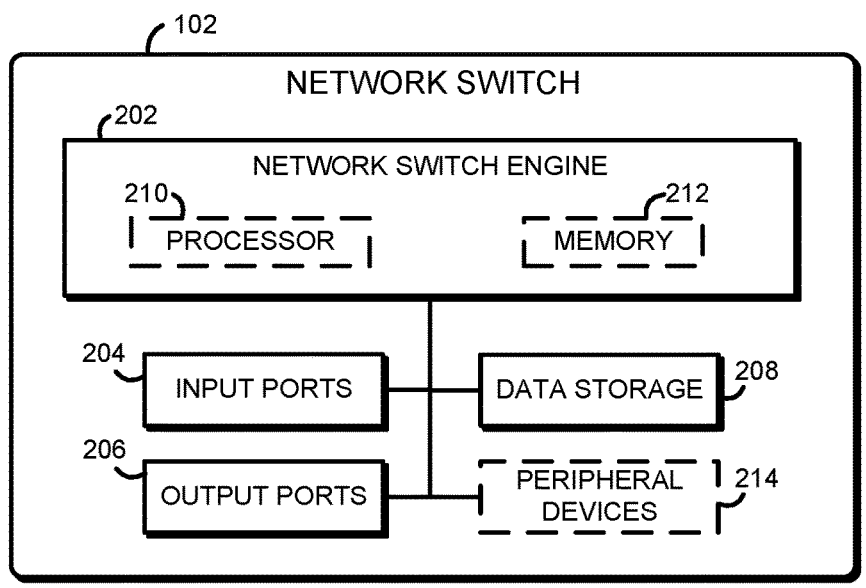
FIG. 2 is a simplified block diagram of at least one embodiment of a network switch of FIG. 1.

Referring now to FIG. 2, an illustrative network switch 102 of the system 100 may be embodied as any type of network switch capable of performing the functions described herein. For example, the network switch 102 may be embodied as or otherwise be included in, without limitation, switch, a router, a hub, a server computer, a compute device, an embedded computing system, a System-on-a-Chip (SoC), a multiprocessor system, a processor-based system, a consumer electronic device, and/or any other computing device. The illustrative network switch 102 includes a network switch engine 202, one or more input ports 204, one or more output ports 206, and data storage 208. In some embodiments, one or more of the illustrative components of the network switch 102 may be incorporated in, or otherwise form a portion of, another component. For example, the network switch engine 202, or portions thereof, may be incorporated in the input ports 204 or output ports 206 in some embodiments.

The network switch engine 202 may be embodied as any electrical circuit or component capable of performing the function described herein. For example, as shown in FIG. 2, the network switch engine 202 may be embodied as, or otherwise include, a processor 210 and a memory 212. In other embodiments, the network switch engine 202 may be embodied as a field programmable gate array (FPGA), an application specific integrated circuit (ASIC), an embedded system, and/or other processing or controlling device, circuit, or collection of devices and/or circuits. For example, in some embodiments, the network switch engine 202 may have a pipeline architecture formed form one or more discrete processing components. The processor 210 may be embodied as any type of processor capable of performing the functions described herein. For example, the processor 210 may be embodied as a single or multi-core processor(s), a single or multi-socket processor, a network processor, a digital signal processor, a graphics processor, a microcontroller, or other processor or processing/controlling circuit. Similarly, the memory 212 may be embodied as any type of volatile or non-volatile memory or data storage capable of performing the functions described herein. In operation, the memory 212 may store various data and software used during operation of the network switch 102 such as operating systems, applications, programs, libraries, and drivers. The memory 212 is communicatively coupled to the processor 210 via an I/O subsystem, which may be embodied as circuitry and/or components to facilitate input/output operations with the processor 210, the memory 212, and other components of the network switch 102. For example, the I/O subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem may form a portion of a system-on-a-chip (SoC) and be incorporated, along with the processor 210, the memory 212, and other components of the network switch 102 on a single integrated circuit chip. It should be appreciated that, in some embodiments, the network switch engine 202 may be embodied as a parallel or distributed architecture. For example, each input port 204 and output port 206 may include an ASIC, FPGA, processor 210, memory 212, etc., and implement some or all of the functionality described herein.

Each input port 204 may be embodied as any port capable of receiving data over a data link 110. For example, each input port 204 may be embodied as an electrical connector, an optical antenna, an antenna, etc., and may be capable of interfacing with any type of data link 110 described above. Similarly, each output port 206 may be embodied as any port capable of sending data over a data link 110. For example, each output port 206 may be embodied as an electrical connector, an optical antenna, an antenna, etc., and may be capable of interfacing with any type of data link 110 described above.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

Of course, in some embodiments, the network switch 102 may include additional components often found in a network switch 102 or other compute device, such as one or more peripheral devices 214. The peripheral devices 214 may include one or more buttons, a keyboard, a mouse, a camera, a display, etc.

Figure 3:
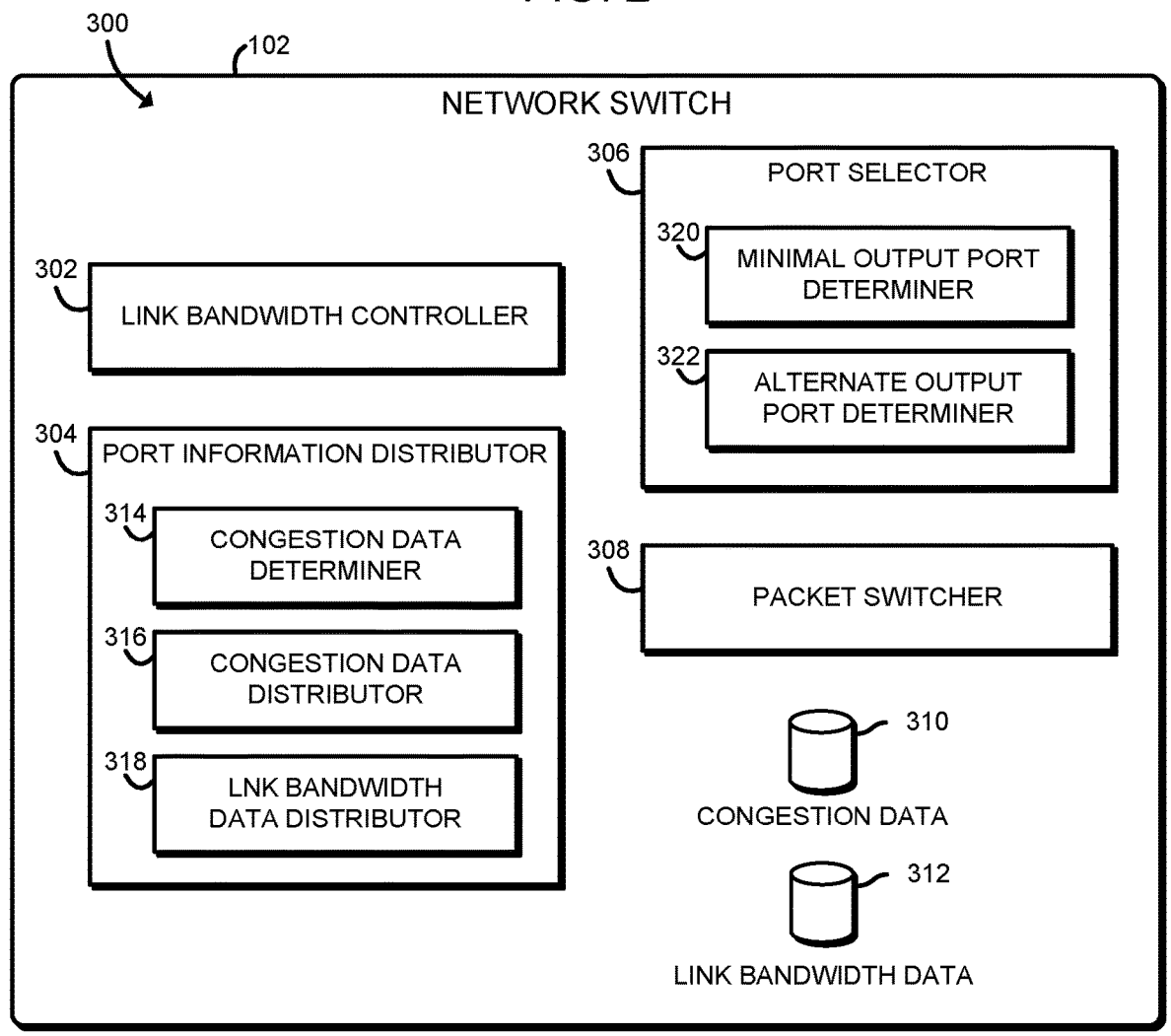
FIG. 3 is a block diagram of at least one embodiment of an environment that may be established by the network switch of FIG. 1.

Referring now to FIG. 3, in use, the network switch 102 may include an environment 300, which may include hardware components, software components, firmware components, and/or a combination thereof. The illustrative environment 300 includes a link bandwidth controller 302, a port information distributor 304, a port selector 306, a packet switcher 308, congestion data 310, and link bandwidth data 312. As stated above, in some embodiments, one or more of the components of the environment 300 may be embodied as circuitry or collection of electrical devices (e.g., a link bandwidth controller circuit 302, a port information distributor circuit 304, a port selector circuit 306, etc.). It should be appreciated that, in such embodiments the link bandwidth controller circuit 302, the port information distributor circuit 304, the port selector circuit 306, etc. may form a portion of one or more of the network switch engine 202, the processor 210, and/or other components of the network switch 102. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor 210 or other components of the network switch 102.

The link bandwidth controller 302 is configured to control the bandwidth of the data links 110 connected to the output ports 206 and/or input ports 204 of the network switch 102. In the illustrative embodiment, the link bandwidth controller 302 controls the bandwidth of the data links 110 from each output port 206 to the corresponding input port 204 on the other end of the data link 110, and the bandwidth of the data link 110 to each input port 204 is controlled by the corresponding output port 206 on the other end of the data link 110. Additionally or alternatively, the link bandwidth controller 302 may control both the bandwidth to an input port 204 and from an output port 206 on a given data link 110. The link bandwidth controller 302 may control the bandwidth in any suitable manner. In the illustrative embodiment, a data link 110 may have several lanes, which can be independently activated and deactivated. A data link 110 may have any suitable number of lanes, such as 2, 4, 8, or 10 lanes. In the illustrative embodiment, a data link 110 that is activated employs a synchronization signal sent from the output port 206 on one side of the data link 110 to the input port 204 on the other side of the data link 110, while a data link 110 that is not activated does not employ a synchronization signal. It should be appreciated that, when a data link 110 is activated, it may take some time for the synchronization signal to be sent by the output port 206 and to be suitably processed by the input port 204, so activating a data link 110 may take a relatively long time. Deactivating a data link 110 can be done relatively quickly by turning off the synchronization signal.

As part of controlling the bandwidth of the data links 110, the link bandwidth controller 302 is configured to determine whether a present bandwidth availability is too high or too low. The link bandwidth controller 302 may determine whether the present bandwidth availability of a data link 110 is too high or too low based on any suitable metric, such as a present occupancy of an output queue associated with the data link 110, a present bandwidth usage of the data link 110, a recent occupancy of the output queue associated with the data link 110, and/or a recent bandwidth usages of the data link 110. It should be appreciated that, in some embodiments, the data link 110 may have a minimum and maximum allowed bandwidth. In such embodiments, if the data link 110 is already at the minimum allowed bandwidth, the link bandwidth controller 302 will not determine that the present bandwidth availability is too high, and if the data link 110 is already at the maximum allowed bandwidth, the link bandwidth controller 302 will not determine that the present bandwidth availability is too low. In the illustrative embodiment, the link bandwidth controller 302 determines whether the present bandwidth availability of a data link 110 is too high by determining a recent bandwidth usage of the data link 110 by determining an average link bandwidth usage over a sliding window. If the average link bandwidth is over a pre-defined threshold relative to the present link bandwidth availability, the link bandwidth controller 302 will activate an additional lane of the data link 110, and if the average link bandwidth is under a pre-defined threshold relative to the present link bandwidth availability, the link bandwidth controller 302 will deactivate a lane of the data link 110. In the illustrative embodiment, one lane of the data link 110 being active corresponds to the minimum bandwidth and all of the lanes of the data link 110 being active corresponds to the maximum bandwidth. As part of controlling the bandwidth of the data links 110, the link bandwidth controller 302 generates the link bandwidth data 312 which can be distributed and used by the various components of the network switch 102.

The port information distributor 304 is configured to distribute information about the status of the ports to various components of the network switch 102. In the illustrative embodiment, information relating to each output port 206 is distributed to each input port 204. Additionally or alternatively, information may be gathered and processed at a central location, such as at a processor 210. The information may be distributed in any suitable manner, such as through the primary communication channel used to transport the network data or a side channel different from the primary communication channel. The side channel may be embodied as any suitable side channel to distribute the information, such as a mesh network.

The port information distributor 304 includes a congestion data determiner 314, a congestion data distributor 316, and a link bandwidth data distributor 318. The congestion data determiner 314 determines congestion data 310 for each output port 206, such as by determining a present queue occupancy or a recent queue occupancy.

The congestion data distributor 316 is configured to distribute congestion data 310 of each output port 206 to each input port 204, and the link bandwidth data distributor 318 is configured to distribute link bandwidth data 312 of each output port 206 to each input port 204. In the illustrative embodiment, the distribution of both the congestion data 310 and the link bandwidth data 312 is distributed over a shared side channel, and the congestion data 310 and the link bandwidth data 312 cannot be distributed simultaneously over the shared side channel. As such, the congestion data 310 and the link bandwidth data 312 may be distributed at different time. In the illustrative embodiment, the congestion data 310 is distributed frequently, such as every cycle to every few cycles of the network switch 102, and the link bandwidth data 312 is distributed less frequently, such as every thousand cycles to every few thousand cycles of the network switch 102. The illustrative congestion data 310 may be distributed as 4 data bits for each output port 206 with an additional bit identifying the data as congestion data 310 instead of link bandwidth data 312, and the link bandwidth data 312 may similarly be distributed as 4 data bits for each output port 206 with an additional bit identifying the data as link bandwidth data 312 instead of congestion data 310. In the illustrative embodiment, each input port 204 receives the congestion data 310 and link bandwidth data 312, and stores the data locally. Each input port 204 may store the link bandwidth data 312 separated into lists, with each output port 206 assigned to a list based on the corresponding link bandwidth data 312.

The port selector 306 is configured to select an output port 206 to use to transfer a particular packet received by an input port 204. The port selector 306 includes a minimal output port determiner 320 and an alternate output port determiner 322. The minimal output port determiner 320 is configured to determine a minimal output port 206 (or an otherwise primary output port 206) to use which provides a minimal path (or otherwise preferred path) for the packet to reach its destination. The minimal output port determiner 320 may use any suitable approach to determine the minimal output port 206, such as by accessing a routing table.

The alternate output port determiner 322 is configured to determine one or more alternate output ports 206. The alternate output port determiner 322 selects ports from the list of output ports 206 with the highest available link bandwidth. If there are more output ports 206 available on the list than the alternate output port determiner 322 needs to determine, the alternate output port determiner 322 may select the output ports 206 from the list in any suitable manner, such as by choosing the output ports 206 randomly. If there are fewer output ports 206 available on the list than the alternate output port determiner 322 needs to determine, then the alternate output port determiner 322 selects all of the output ports 206 on that list, and then moves to the list of output ports 206 with the next highest available link bandwidth, and repeats the process above to choose the remaining output ports 206. The alternate output port determiner 322 may determine any suitable number of alternate output ports 206, such as 1, 2, 4, 5, 10, etc. In the illustrative embodiment, the alternate output port determiner 322 determines two alternate output ports 206.

If the congestion data 310 associated with the minimal output port 206 is below a threshold, the port selector 306 may select the minimal output port 206 (and may not even determine the alternate output ports 206). If the congestion data 310 associated with the minimal output port 206 is above the threshold, the port selector 306 may select an output port 206 from among the minimal output port 206 selected by the minimal output port determiner 320 and the alternate output ports 206 selected by the alternate output port determiner 322. The port selector 306 compares the congestion data 310 of the minimal port 206 and the alternate output ports 206 and selects the output port 206 with the lowest congestion. In the illustrative embodiment, the port selector 306 applies a bias to the congestion data 310 of the minimal port 206 before comparing the congestion data 310, so the minimal port 206 may be preferentially chosen if the difference between the congestion of the minimal port 206 and the output port 206 with the lowest congestion is within a threshold value.

The packet switcher 308 is configured to switch the packet received from an input port 204 to the output port 206 selected by the port selector 306 and to send the packet across the corresponding data link 110. The packet switcher 308 may use any suitable approach to switching and sending the packet, such as by using an output queue and may apply Quality of Service operations, may drop or prioritize the packet when appropriate, and/or the like.

It should be appreciated that the various components described in FIG. 3 work together to improve the overall performance of the network switch 102. For example, if the minimal output port 206 is congested, the port selector 306 will consider alternate output ports 206 with a high available bandwidth, alleviating the congestion at the minimal output port 206. If there are not enough output ports 206 with a high link bandwidth availability, the port selector 306 will select an output port 206 with a relatively low link bandwidth availability. As the selected output port 206 uses more bandwidth, the link bandwidth controller 302 will increase the bandwidth of the associated data link 110. As such, the available link bandwidth can be dynamically adjusted as necessary based on the use of the corresponding data link 110 caused by the port selector 306.

Figure 4:
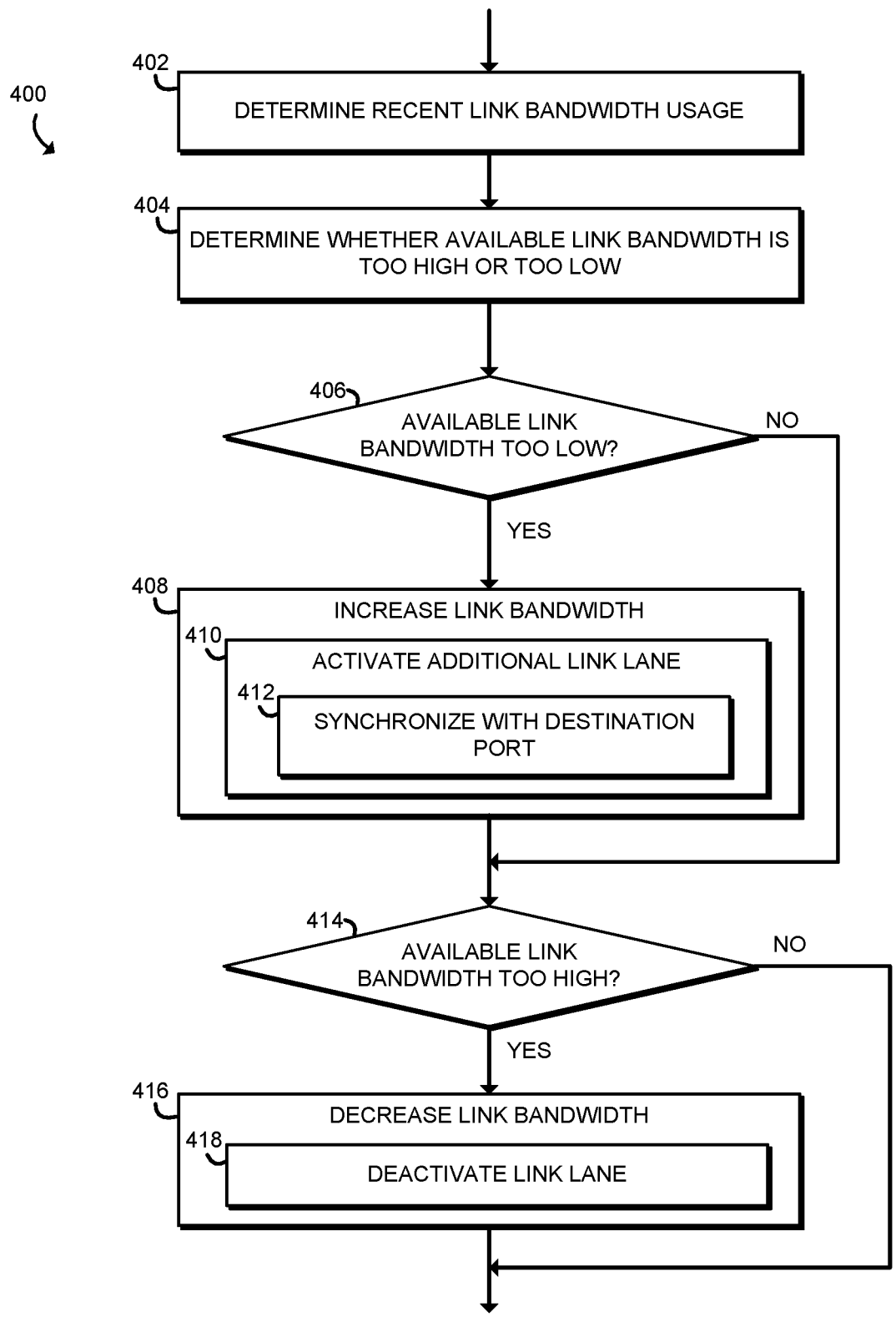
FIG. 4 is a simplified flow diagram of at least one embodiment of a method for controlling link bandwidth that may be executed by the network switch of FIG. 1.

Referring now to FIG. 4, in use, the network switch 102 may execute a method 400 for controlling link bandwidth availability. In some embodiments, the method 400 may represent the logic of the network switch engine 202 (e.g., the logic of an ASIC, an FPGA, or software instructions executed by the processor 210). In the illustrative embodiment, the method 400 may be executed independently at each input port 204. Additionally or alternatively, the method 400 may be executed at some central component of the network switch 102, such as the processor 210. The method 400 begins in block 402, in which the network switch 102 determines a recent link bandwidth usage of a data link 110. In the illustrative embodiment, the network switch 102 determines a recent bandwidth usage of the data link 110 by determining an average link bandwidth usage over a sliding window in time.

In block 404, the network switch 102 determines whether the available link bandwidth is too high or too low. In the illustrative embodiment, if the average link bandwidth is under a pre-defined threshold relative to the present link bandwidth availability, the network switch 102 may determine that the available link bandwidth is too high, and if the average link bandwidth is over a pre-defined threshold relative to the present link bandwidth availability, the network switch 102 may determine that the available link bandwidth is too low. It should be appreciated that, in the illustrative embodiment, if the present link bandwidth is at a minimum level, the network switch 102 will not determine that the available link bandwidth is too high, and if the present link bandwidth is at a maximum level, the network switch 102 will not determine that the available link bandwidth is too low.

In block 406, if the link bandwidth is not too low, the method 400 proceeds to block 414, in which the network switch 102 makes a decision based on whether the link bandwidth is too high. If the link bandwidth is too low, the method 400 proceeds to block 408, in which the network switch 102 increases the link bandwidth. In block 410, the network switch 102 activates one or more additional link lanes of the data link 110. In block 410, the network switch 102 synchronizes with a destination input port 204 on the other end of the data link 110 by sending a synchronization signal from the output port 206. It should be appreciated that, when a data link 110 is activated, it may take some time for the synchronization signal to be sent by the output port 206 and to be suitably processed by the input port 204, so activating a data link 110 may take a relatively long time.

In block 414, if the link bandwidth is not too high, the method 400 proceeds to the end of the method 400 shown in FIG. 4, where the network switch 102 may continue with other tasks. If the link bandwidth is too high, the method 400 proceeds to block 416, in which the network switch 102 decreases the link bandwidth of the data link 110. In block 418, the network switch 102 may deactivate one or more link lanes of the data link 110 in order to decrease the link bandwidth.

Figure 5:
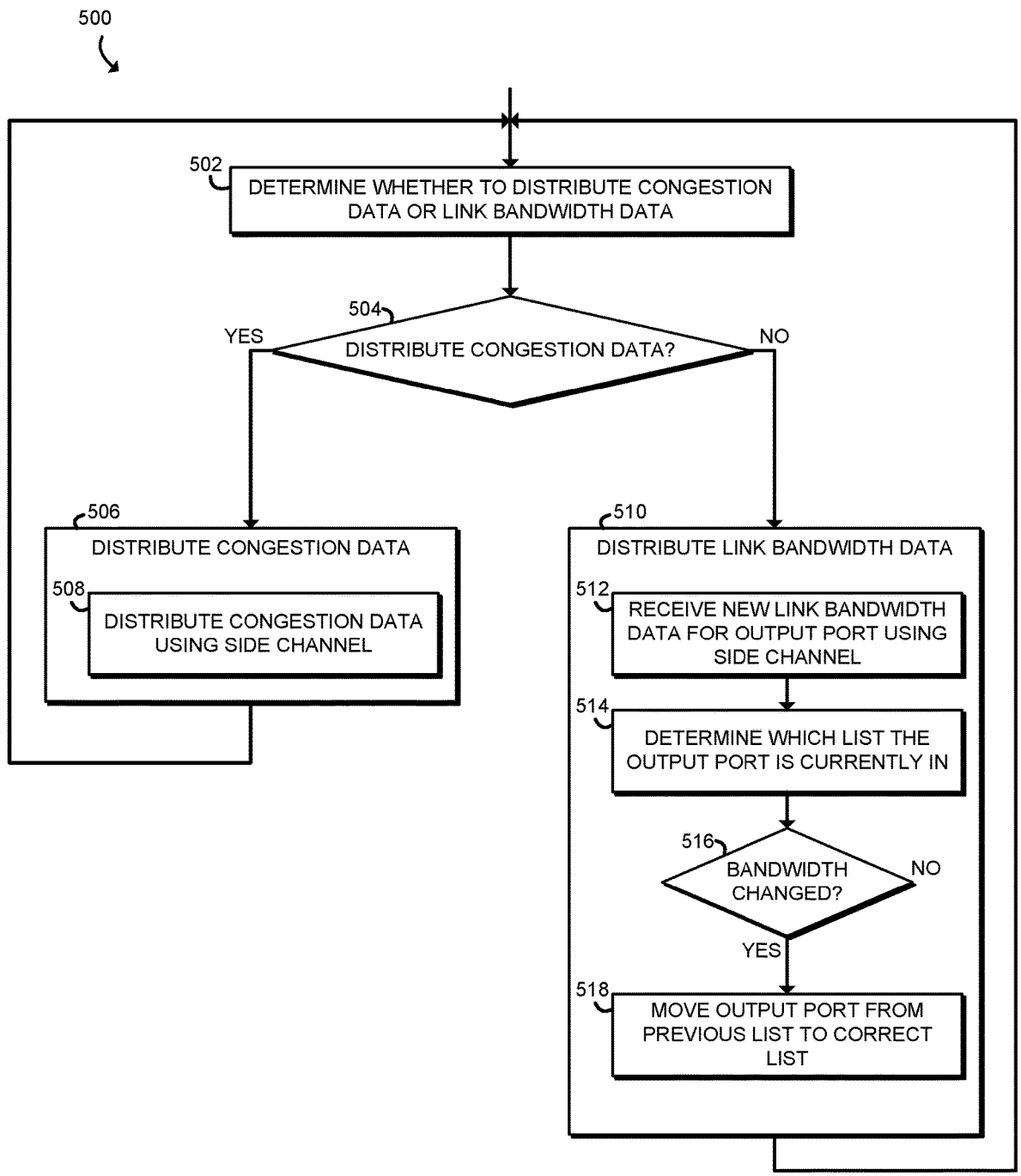
FIG. 5 is a simplified flow diagram of at least one embodiment of a method for distributing congestion data and link bandwidth data that may be executed by the network switch of FIG. 1.

Referring now to FIG. 5, in use, the network switch 102 may execute a method 500 for distributing congestion data and link bandwidth data to components in the network switch 102. In some embodiments, the method 500 may represent the logic of the network switch engine 202 (e.g., the logic of an ASIC, an FPGA, or software instructions executed by the processor 210). The method 500 begins in block 502, in which the network switch 102 determines whether to distribute congestion data or link bandwidth data. The network switch 102 may determine whether to distribute congestion data or link bandwidth data on any suitable criteria, such as which data was distributed most recently, how long ago one type of data was distributed, etc. In the illustrative embodiment, the congestion data 310 is distributed frequently, such as every cycle to every few cycles of the network switch 102, and the link bandwidth data 312 is distributed less frequently, such as every thousand cycles to every few thousand cycles of the network switch 102. As such, the network switch 102 may determine whether to distribute the link bandwidth data based on how many times the congestion data has been distributed since the link bandwidth data was distributed (such as 100, 200, 500, 1,000, or 2,000 times), or based on how much time has elapsed since the link bandwidth data was distributed (such as 500, 1,000, 2,000, or 5,000 nanoseconds).

In block 504, if the network switch 102 is to distribute congestion data, the method 500 proceeds to block 506, in which the network switch distributes congestion data. The network switch 102 may distribute the information in any suitable manner, such as through the primary communication channel used to transport the network data or a side channel different from the primary communication channel. In the illustrative embodiment, the network switch 102 distributes the congestion information through a side channel in block 508. The side channel may be embodied as any suitable side channel to distribute the information, such as a mesh network. In the illustrative embodiment, the congestion data as distributed may be embodied as 4 data bits for each output port 206 with an additional bit identifying the data as congestion data 310 instead of link bandwidth data 312.

Referring back to block 504, if the network switch 102 is not to distribute congestion information, the method 500 proceeds to block 510, in which the network switch 102 distributes link bandwidth data. The network switch 102 may distribute the information in any suitable manner, such as through the primary communication channel used to transport the network data or a side channel different from the primary communication channel. In the illustrative embodiment, the network switch 102 distributes the congestion information through a side channel, which is received by each input port 204, which executes blocks 512-518 each time the input port 204 receives new link bandwidth data for an output port 206. The link bandwidth data as distributed may be embodied as 4 data bits for each output port 206 with an additional bit identifying the data as link bandwidth data instead of congestion data.

In block 512, an input port 204 receives link bandwidth data for an output port 206 of the network switch 102 using a side channel. The side channel may be embodied as any suitable side channel to distribute the information, such as a mesh network. As discussed above, each input port 204 may maintain several lists, with each list corresponding to a certain available link bandwidth and including the output ports 206 with the corresponding available link bandwidth. In block 514, the input port 204 determines which list the output port 206 is presently in. In block 516, if the bandwidth has not changed, the input port 204 does not need to change any list. If the bandwidth has changed, the input port 204 moves the output port 206 from the previous list to the correct list based on the new link bandwidth data.

Figure 6:
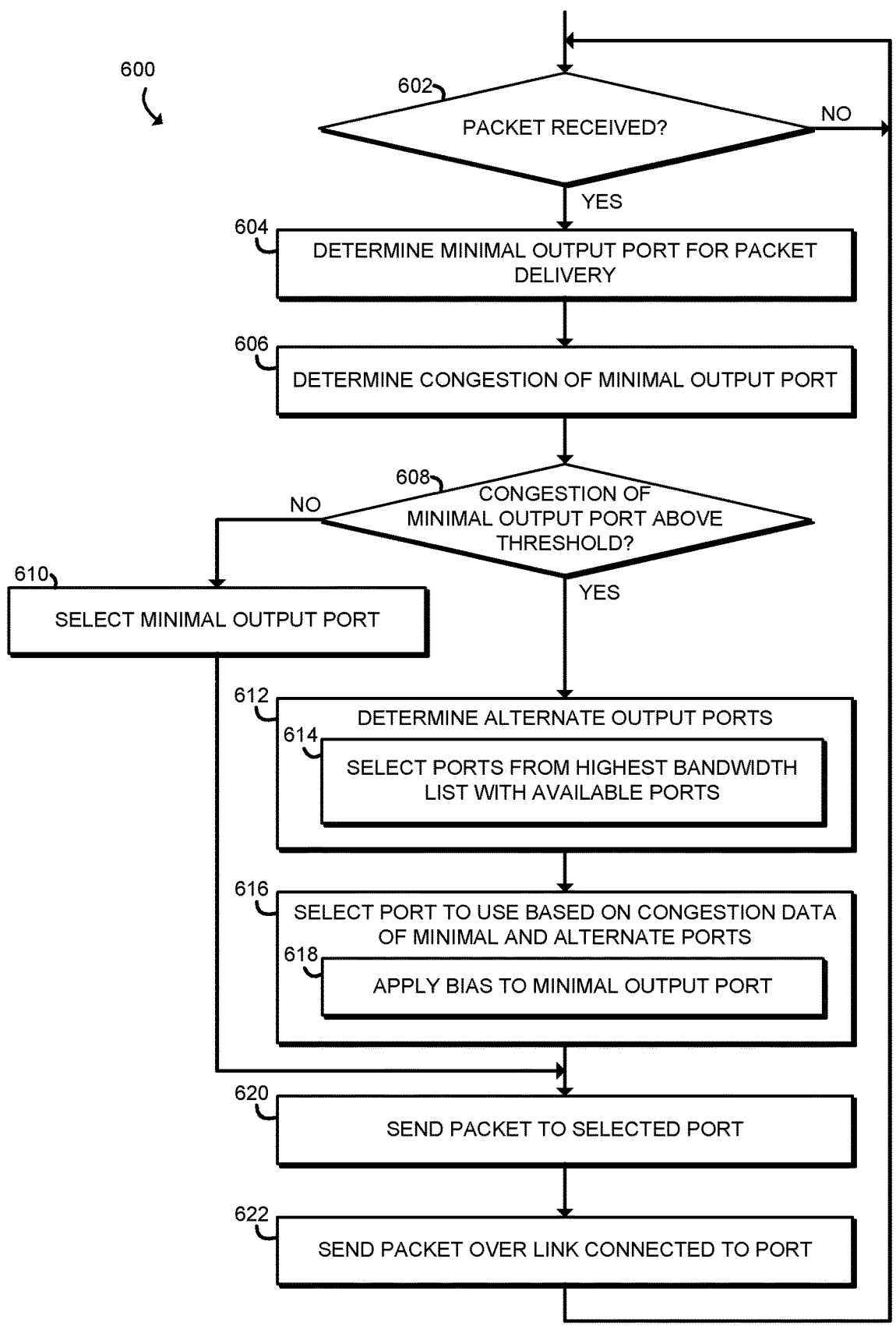
FIG. 6 is a simplified flow diagram of at least one embodiment of a method for link-bandwidth-aware routing that may be executed by the network switch of FIG. 1.

Referring now to FIG. 6, in use, the network switch 102 may execute a method 600 for link-bandwidth-aware routing. In some embodiments, the method 600 may represent the logic of the network switch engine 202 (e.g., the logic of an ASIC, an FPGA, or software instructions executed by the processor 210). The method 600 begins in block 602, in which, if the network switch 102 has not received a packet at an input port 204, loops back to block 602 to wait for a packet. If the network switch 102 has received a packet at an input port 204, the network switch 102 proceeds to block 604, in which the network switch 102 determines a minimal output port for packet delivery. The network switch 102 may determine a minimal output port 206 which provides a minimal path for the packet to reach its destination. The network switch 102 may use any suitable approach to determine the minimal output port 206, such as by accessing a routing table.

In block 606, the network switch 102 determines a congestion of the minimal output port 206, such as by accessing congestion data corresponding to the minimal output port 206 stored locally at the input port 204 that received the packet. In block 608, if the congestion of the minimal output port 206 is not above a threshold, the method 600 proceeds to block 610, in which the network switch 102 selects the minimal output port 206 to use, and the method 600 then proceeds from block 610 to block 620, in which the packet is sent to the selected port.

Referring back to block 608, if the congestion of the minimal output port 206 is above the threshold, the method 600 proceeds to block 612, in which the network switch 102 determines alternate output ports 206. In the illustrative embodiment, the network switch 102 may select ports from the list of output ports 206 with the highest available link bandwidth in block 614. If there are more output ports 206 available on the list than the network switch 102 needs to determine, the network switch 102 may select the output ports 206 from the list in any suitable manner, such as by choosing the output ports 206 randomly. If there are fewer output ports 206 available on the list than the network switch 102 needs to determine, then the network switch 102 selects all of the output ports 206 on that list, and then considers the list of output ports 206 with the next highest available link bandwidth, and repeats the process above to choose the remaining output ports 206. In the illustrative embodiment, the network switch 102 determines two alternate output ports 206.

In block 616, the network switch 102 selects the output port 206 to use from among the minimal output port 206 and the determined alternate output ports 206 based on the congestion data of the minimal and alternate output ports 206. The network switch 102 may compare the congestion of the minimal and alternate output ports 206, and select the output port 206 with the lowest congestion. In the illustrative embodiment, the network switch 102 applies a bias to the congestion data of the minimal port 206 before comparing the congestion data, so the minimal port 206 may be preferentially chosen if the difference between the congestion of the minimal port 206 and the output port 206 with the lowest congestion is within a threshold value.

In block 620, the network switch 102 sends the packet from the input port 204 which received the packet to the selected output port 206. In block 622, the network switch 102 sends the packet over the data link 110 connected to the selected output port 206.

EXAMPLES

Illustrative examples of the devices, systems, and methods disclosed herein are provided below. An embodiment of the devices, systems, and methods may include any one or more, and any combination of, the examples described below.

Example 1 includes a network switch for link-bandwidth-aware routing, the network switch comprising a plurality of input ports; a plurality of output ports; and a network switch engine to determine a congestion level for each of the plurality of output ports; determine link bandwidth data indicative of a link bandwidth for each of the plurality of output ports; receive, from a data link connected to an input port of the plurality of input ports of the network switch, a packet including destination information; determine, based on the destination information, a primary output port of the plurality of output ports for delivery of the packet; determine, based on the link bandwidth data, at least two alternate output ports of the plurality of output ports different from the primary output port; select, based on the congestion level for each of the primary output port and the at least two alternate output ports, a low-congestion output port from among the primary output port and the at least two alternate output ports; and send the packet over a data link connected to the low-congestion output port.

Example 2 includes the subject matter of Example 1, and wherein to determine the congestion level for each of the plurality of output ports comprises to receive, for each of the plurality of output ports, the corresponding congestion level over a side channel of the network switch.

Example 3 includes the subject matter of any of Examples 1 and 2, and wherein for each of the plurality of output ports, the corresponding congestion level comprises a queue occupancy level.

Example 4 includes the subject matter of any of Examples 1-3, and wherein to determine the link bandwidth data comprises to receive the link bandwidth data over a side channel of the network switch.

Example 5 includes the subject matter of any of Examples 1-4, and wherein the link bandwidth data comprises, for each of the plurality of output ports, a number of active link lanes of a data link connected to the corresponding output port.

Example 6 includes the subject matter of any of Examples 1-5, and wherein to determine the link bandwidth data comprises, to assign, by each input port of the plurality of input ports, each output port of the plurality of output ports to a list associated with the corresponding input port based on the number of active link lanes of the data link connected to the corresponding output port.

Example 7 includes the subject matter of any of Examples 1-6, and wherein the network switch engine is further to determine, for each output port of the plurality of output ports, a recent bandwidth usage of a data link connected to the corresponding output port; and determine, for each output port of the plurality of output ports, whether an available link bandwidth of the data link connected to the corresponding output port is too low or too high.

Example 8 includes the subject matter of any of Examples 1-7, and wherein the network switch engine is further to decrease, in response to a determination that the available link bandwidth of the data link connected to at least one output port is too high, the available link bandwidth of the data link connected to the at least one output port.

Example 9 includes the subject matter of any of Examples 1-8, and wherein to decrease the available link bandwidth of the data link connected to the at least one output port comprises to deactivate a link lane of the data link connected to the at least one output port.

Example 10 includes the subject matter of any of Examples 1-9, and wherein the network switch engine is further to increase, in response to a determination that the available link bandwidth of the data link connected to at least one output port is too low, the available link bandwidth of the data link connected to the at least one output port.

Example 11 includes the subject matter of any of Examples 1-10, and wherein to increase the available link bandwidth of the data link connected to the at least one output port comprises to activate a link lane of the data link connected to the at least one output port.

Example 12 includes the subject matter of any of Examples 1-11, and wherein to activate the link lane comprises to establish a synchronization signal over the link lane with a remote input port.

Example 13 includes the subject matter of any of Examples 1-12, and wherein to determine the primary output port comprises to determine the primary output port based on a routing table of the network switch.

Example 14 includes the subject matter of any of Examples 1-13, and wherein to determine the at least two alternate output ports comprises to select the at least two alternate output ports with the highest available link bandwidth based on the link bandwidth data.

Example 15 includes the subject matter of any of Examples 1-14, and wherein to select the at least two alternate output ports with the highest available link bandwidth comprises to randomly select the at least two alternate output ports from a set of output ports of the plurality of output ports with the same available link bandwidth.

Example 16 includes the subject matter of any of Examples 1-15, and wherein to select the low-congestion output port from among the primary output port and the at least two alternate output ports comprises to select the output port with the lowest congestion level from among the primary output port and the at least two alternate output ports.

Example 17 includes the subject matter of any of Examples 1-16, and wherein the network switch engine is further to apply a bias to the congestion level of the primary output port, wherein to select the low-congestion output port from among the primary output port and the at least two alternate output ports comprises to compare the congestion levels of the at least two alternate output ports with the biased congestion level of the primary output port.

Example 18 includes a method for link-bandwidth-aware routing by a network switch, the method comprising determining, by the network switch, a congestion level for each of a plurality of output ports of the network switch; determining, by the network switch, link bandwidth data indicative of a link bandwidth for each of the plurality of output ports; receiving, by the network switch and from a data link connected to an input port of a plurality of input ports of the network switch, a packet including destination information; determining, by the network switch and based on the destination information, a primary output port of the plurality of output ports for delivery of the packet; determining, by the network switch and based on the link bandwidth data, at least two alternate output ports of the plurality of output ports different from the primary output port; selecting, by the network switch and based on the congestion level for each of the primary output port and the at least two alternate output ports, a low-congestion output port from among the primary output port and the at least two alternate output ports; and sending, by the network switch, the packet over a data link connected to the low-congestion output port.

Example 19 includes the subject matter of Example 18, and wherein determining the congestion level for each of the plurality of output ports comprises receiving, by the network switch and for each of the plurality of output ports, the corresponding congestion level over a side channel of the network switch.

Example 20 includes the subject matter of any of Examples 18 and 19, and wherein for each of the plurality of output ports, the corresponding congestion level comprises a queue occupancy level.

Example 21 includes the subject matter of any of Examples 18-20, and wherein determining the link bandwidth data comprises receiving the link bandwidth data over a side channel of the network switch.

Example 22 includes the subject matter of any of Examples 18-21, and wherein the link bandwidth data comprises, for each of the plurality of output ports, a number of active link lanes of a data link connected to the corresponding output port.

Example 23 includes the subject matter of any of Examples 18-22, and wherein determining the link bandwidth data comprises, assigning, by each input port of the plurality of input ports, each output port of the plurality of output ports to a list associated with the corresponding input port based on the number of active link lanes of the data link connected to the corresponding output port.

Example 24 includes the subject matter of any of Examples 18-23, and further including determining, by the network switch and for each output port of the plurality of output ports, a recent bandwidth usage of a data link connected to the corresponding output port; and determining, by the network switch and for each output port of the plurality of output ports, whether an available link bandwidth of the data link connected to the corresponding output port is too low or too high.

Example 25 includes the subject matter of any of Examples 18-24, and further including decreasing, by the network switch and in response to a determination that the available link bandwidth of the data link connected to at least one output port is too high, the available link bandwidth of the data link connected to the at least one output port.

Example 26 includes the subject matter of any of Examples 18-25, and wherein decreasing the available link bandwidth of the data link connected to the at least one output port comprises deactivating a link lane of the data link connected to the at least one output port.

Example 27 includes the subject matter of any of Examples 18-26, and further including increasing, by the network switch and in response to a determination that the available link bandwidth of the data link connected to at least one output port is too low, the available link bandwidth of the data link connected to the at least one output port.

Example 28 includes the subject matter of any of Examples 18-27, and wherein increasing the available link bandwidth of the data link connected to the at least one output port comprises activating a link lane of the data link connected to the at least one output port.

Example 29 includes the subject matter of any of Examples 18-28, and wherein activating the link lane comprises establishing a synchronization signal over the link lane with a remote input port.

Example 30 includes the subject matter of any of Examples 18-29, and wherein determining the primary output port comprises determining the primary output port based on a routing table of the network switch.

Example 31 includes the subject matter of any of Examples 18-30, and wherein determining the at least two alternate output ports comprises selecting the at least two alternate output ports with the highest available link bandwidth based on the link bandwidth data.

Example 32 includes the subject matter of any of Examples 18-31, and wherein selecting the at least two alternate output ports with the highest available link bandwidth comprises randomly selecting the at least two alternate output ports from a set of output ports of the plurality of output ports with the same available link bandwidth.

Example 33 includes the subject matter of any of Examples 18-32, and wherein selecting the low-congestion output port from among the primary output port and the at least two alternate output ports comprises selecting the output port with the lowest congestion level from among the primary output port and the at least two alternate output ports.

Example 34 includes the subject matter of any of Examples 18-33, and further including applying a bias to the congestion level of the primary output port, wherein selecting the low-congestion output port from among the primary output port and the at least two alternate output ports comprises comparing the congestion levels of the at least two alternate output ports with the biased congestion level of the primary output port.

Example 35 includes one or more computer-readable media comprising a plurality of instructions stored thereon that, when executed, causes a network switch to perform the method of any of Examples 18-34.

Example 36 includes a network switch for link-bandwidth-aware routing, the network switch comprising a plurality of input ports; a plurality of output ports; a network switch engine to receive, from a data link connected to an input port of the plurality of input ports, a packet including destination information; means for determining a congestion level for each of a plurality of output ports of the network switch; means for determining link bandwidth data indicative of a link bandwidth for each of the plurality of output ports; means for determining, based on the destination information, a primary output port of the plurality of output ports for delivery of the packet; means for determining, based on the link bandwidth data, at least two alternate output ports of the plurality of output ports different from the primary output port; and means for selecting, based on the congestion level for each of the primary output port and the at least two alternate output ports, a low-congestion output port from among the primary output port and the at least two alternate output ports, wherein the network switch engine is further to send the packet over a data link connected to the low-congestion output port.

Example 37 includes the subject matter of Example 36, and wherein the means for determining the congestion level for each of the plurality of output ports comprises means for receiving, for each of the plurality of output ports, the corresponding congestion level over a side channel of the network switch.

Example 38 includes the subject matter of any of Examples 36 and 37, and wherein for each of the plurality of output ports, the corresponding congestion level comprises a queue occupancy level.

Example 39 includes the subject matter of any of Examples 36-38, and wherein the means for determining the link bandwidth data comprises means for receiving the link bandwidth data over a side channel of the network switch.

Example 40 includes the subject matter of any of Examples 36-39, and wherein the link bandwidth data comprises, for each of the plurality of output ports, a number of active link lanes of a data link connected to the corresponding output port.

Example 41 includes the subject matter of any of Examples 36-40, and wherein the means for determining the link bandwidth data comprises, means for assigning, by each input port of the plurality of input ports, each output port of the plurality of output ports to a list associated with the corresponding input port based on the number of active link lanes of the data link connected to the corresponding output port.

Example 42 includes the subject matter of any of Examples 36-41, and further including means for determining, for each output port of the plurality of output ports, a recent bandwidth usage of a data link connected to the corresponding output port; and means for determining, for each output port of the plurality of output ports, whether an available link bandwidth of the data link connected to the corresponding output port is too low or too high.

Example 43 includes the subject matter of any of Examples 36-42, and further including means for decreasing, in response to a determination that the available link bandwidth of the data link connected to at least one output port is too high, the available link bandwidth of the data link connected to the at least one output port.

Example 44 includes the subject matter of any of Examples 36-43, and wherein the means for decreasing the available link bandwidth of the data link connected to the at least one output port comprises means for deactivating a link lane of the data link connected to the at least one output port.

Example 45 includes the subject matter of any of Examples 36-44, and further including means for increasing, in response to a determination that the available link bandwidth of the data link connected to at least one output port is too low, the available link bandwidth of the data link connected to the at least one output port.

Example 46 includes the subject matter of any of Examples 36-45, and wherein the means for increasing the available link bandwidth of the data link connected to the at least one output port comprises means for activating a link lane of the data link connected to the at least one output port.

Example 47 includes the subject matter of any of Examples 36-46, and wherein the means for activating the link lane comprises means for establishing a synchronization signal over the link lane with a remote input port.

Example 48 includes the subject matter of any of Examples 36-47, and wherein the means for determining the primary output port comprises means for determining the primary output port based on a routing table of the network switch.

Example 49 includes the subject matter of any of Examples 36-48, and wherein the means for determining the at least two alternate output ports comprises means for selecting the at least two alternate output ports with the highest available link bandwidth based on the link bandwidth data.

Example 50 includes the subject matter of any of Examples 36-49, and wherein the means for selecting the at least two alternate output ports with the highest available link bandwidth comprises randomly means for selecting the at least two alternate output ports from a set of output ports of the plurality of output ports with the same available link bandwidth.

Example 51 includes the subject matter of any of Examples 36-50, and wherein the means for selecting the low-congestion output port from among the primary output port and the at least two alternate output ports comprises means for selecting the output port with the lowest congestion level from among the primary output port and the at least two alternate output ports.

Example 52 includes the subject matter of any of Examples 36-51, and further including applying a bias to the congestion level of the primary output port, wherein the means for selecting the low-congestion output port from among the primary output port and the at least two alternate output ports comprises means for comparing the congestion levels of the at least two alternate output ports with the biased congestion level of the primary output port.

The invention claimed is:
1. A network switch for link-bandwidth-aware routing, the network switch comprising:
 a plurality of input ports;
 a plurality of output ports; and
 a network switch engine to:
  determine a congestion level for each of the plurality of output ports;
  receive, over a channel of the network switch, link bandwidth data indicative of a link bandwidth for each of the plurality of output ports and indicative of a number of active link lanes of a data link to be connected to a corresponding output port;
  receive, from a data link to be connected to an input port of the plurality of input ports of the network switch, a packet to include destination information;
  determine, based on the destination information, a primary output port of the plurality of output ports for delivery of the packet;
  determine, based on the link bandwidth data, at least two alternate output ports of the plurality of output ports different from the primary output port;
  select, based on the congestion level for each of the primary output port and the at least two alternate output ports, a low-congestion output port from among the primary output port and the at least two alternate output ports; and
  send the packet over a data link connected to the low-congestion output port.

2. The network switch of claim 1, further comprising the network switch engine to assign, by each input port of the plurality of input ports, each output port of the plurality of output ports to a list associated with a corresponding input port based on a number of active link lanes of the data link connected to a corresponding output port.

3. The network switch of claim 1, further comprising the network switch engine to:
  determine, for each output port of the plurality of output ports, a recent bandwidth usage of a data link to be connected to a corresponding output port; and
  determine, for each output port of the plurality of output ports and based on the recent bandwidth usage, whether a current maximum bandwidth capacity of a data link to be connected to a corresponding output port is too low or too high.

4. The network switch of claim 3, further comprising the network switch engine to decrease, in response to a determination that the current maximum bandwidth capacity of the data link to be connected to the corresponding output port is too high, an available link bandwidth of the data link to be connected to the corresponding output port.

5. The network switch of claim 3, further comprising the network switch engine to increase, in response to a determination that the current maximum bandwidth capacity of the data link connected to the corresponding output port is too low, an available link bandwidth of the data link connected to the corresponding output port.

6. The network switch of claim 1, comprising the network switch engine to apply a bias to the congestion level of the primary output port, wherein to select the low-congestion output port from among the primary output port and the at least two alternate output ports includes the network switch engine to compare congestion levels of the at least two alternate output ports with the biased congestion level of the primary output port.

7. The network switch of claim 1, wherein the data link to be connected to each of the plurality of output ports comprises a plurality of link lanes, wherein each of the plurality of link lanes for each of the plurality of output ports is able to be independently enabled or disabled.

8. A method for link-bandwidth-aware routing by a network switch, the method comprising:
  determining a congestion level for each of a plurality of output ports of the network switch;
  receiving, over a channel of the network switch, link bandwidth data indicative of a link bandwidth for each of the plurality of output ports and indicative of a number of active link lanes of a data link to be connected to a corresponding output port;
  receiving, from a data link connected to an input port of a plurality of input ports of the network switch, a packet including destination information;
  determining, based on the destination information, a primary output port of the plurality of output ports for delivery of the packet;
  determining, based on the link bandwidth data, at least two alternate output ports of the plurality of output ports different from the primary output port;
  selecting, based on the congestion level for each of the primary output port and the at least two alternate output ports, a low-congestion output port from among the primary output port and the at least two alternate output ports; and
  sending the packet over a data link connected to the low-congestion output port.

9. The method of claim 8, further comprising assigning, by each input port of the plurality of input ports, each output port of the plurality of output ports to a list associated with a corresponding input port based on a number of active link lanes of the data link connected to a corresponding output port.

10. The method of claim 8, further comprising:
  determining, for each output port of the plurality of output ports, a recent bandwidth usage of a data link connected to a corresponding output port; and
  determining, for each output port of the plurality of output ports, whether an available link bandwidth of a data link connected to a corresponding output port is too low or too high.

11. The method of claim 10, further comprising decreasing, in response to a determination that the available link bandwidth of the data link connected to the corresponding output port is too high, an available link bandwidth of the data link connected to the corresponding output port.

12. The method of claim 8, further comprising applying a bias to the congestion level of the primary output port, wherein selecting the low-congestion output port from among the primary output port and the at least two alternate output ports includes comparing the congestion levels of the at least two alternate output ports with the biased congestion level of the primary output port.

13. One or more non-transitory computer-readable media comprising a plurality of instructions stored thereon that, when executed, causes a network switch to:
  determine a congestion level for each of a plurality of output ports of the network switch;
  receive, over a channel of the network switch, link bandwidth data indicative of a link bandwidth for each of a plurality of output ports of the network switch and indicative of a number of active link lanes of a data link to be connected to a corresponding output port;
  receive, from a data link to be connected to an input port of a plurality of input ports of the network switch, a packet to include destination information;
  determine, based on the destination information, a primary output port of the plurality of output ports for delivery of the packet;
  determine, based on the link bandwidth data, at least two alternate output ports of the plurality of output ports different from the primary output port;
  select, based on the congestion level for each of the primary output port and the at least two alternate output ports, a low-congestion output port from among the primary output port and the at least two alternate output ports; and
  send the packet over a data link connected to the low-congestion output port.

14. The one or more non-transitory computer-readable media of claim 13, wherein the plurality of instructions further causes the network switch to assign, by each input port of the plurality of input ports, each output port of the plurality of output ports to a list associated with a corresponding input port based on a number of active link lanes of the data link connected to a corresponding output port.

15. The one or more non-transitory computer-readable media of claim 13, wherein the plurality of instructions further causes the network switch to:
  determine, for each output port of the plurality of output ports, a recent bandwidth usage of a data link connected to a corresponding output port; and
  determine, for each output port of the plurality of output ports, whether an available link bandwidth of a data link connected to a corresponding output port is too low or too high.

16. The one or more non-transitory computer-readable media of claim 15, wherein the plurality of instructions further causes the network switch to decrease, in response to a determination that the available link bandwidth of the data link connected to the corresponding output port is too high, an available link bandwidth of the data link connected to the corresponding output port.

17. A network switch for link-bandwidth-aware routing, the network switch comprising:
- a plurality of input ports;
- a plurality of output ports;
- a network switch engine to receive, from a data link connected to an input port of the plurality of input ports, a packet including destination information;
- means for determining a congestion level for each of a plurality of output ports of the network switch;
- means for receiving, over a channel of the network switch, link bandwidth data indicative of a link bandwidth for each of the plurality of output ports and indicative of a number of active link lanes of a data link to be connected to a corresponding output port;
- means for determining, based on the destination information, a primary output port of the plurality of output ports for delivery of the packet;
- means for determining, based on the link bandwidth data, at least two alternate output ports of the plurality of output ports different from the primary output port; and
- means for selecting, based on the congestion level for each of the primary output port and the at least two alternate output ports, a low-congestion output port from among the primary output port and the at least two alternate output ports,
- wherein the network switch engine is further to send the packet over a data link connected to the low-congestion output port.

18. The network switch of claim 17, further comprising:
- means for determining, for each output port of the plurality of output ports, a recent bandwidth usage of a data link connected to a corresponding output port; and
- means for determining, for each output port of the plurality of output ports, whether an available link bandwidth of a data link connected to a corresponding output port is too low or too high.

19. The network switch of claim 18, further comprising means for decreasing, in response to a determination that the available link bandwidth of the data link connected to the corresponding output port is too high, an available link bandwidth of the data link connected to the corresponding output port.

* * * * *